United States Patent Office 2,872,653
Patented Feb. 3, 1959

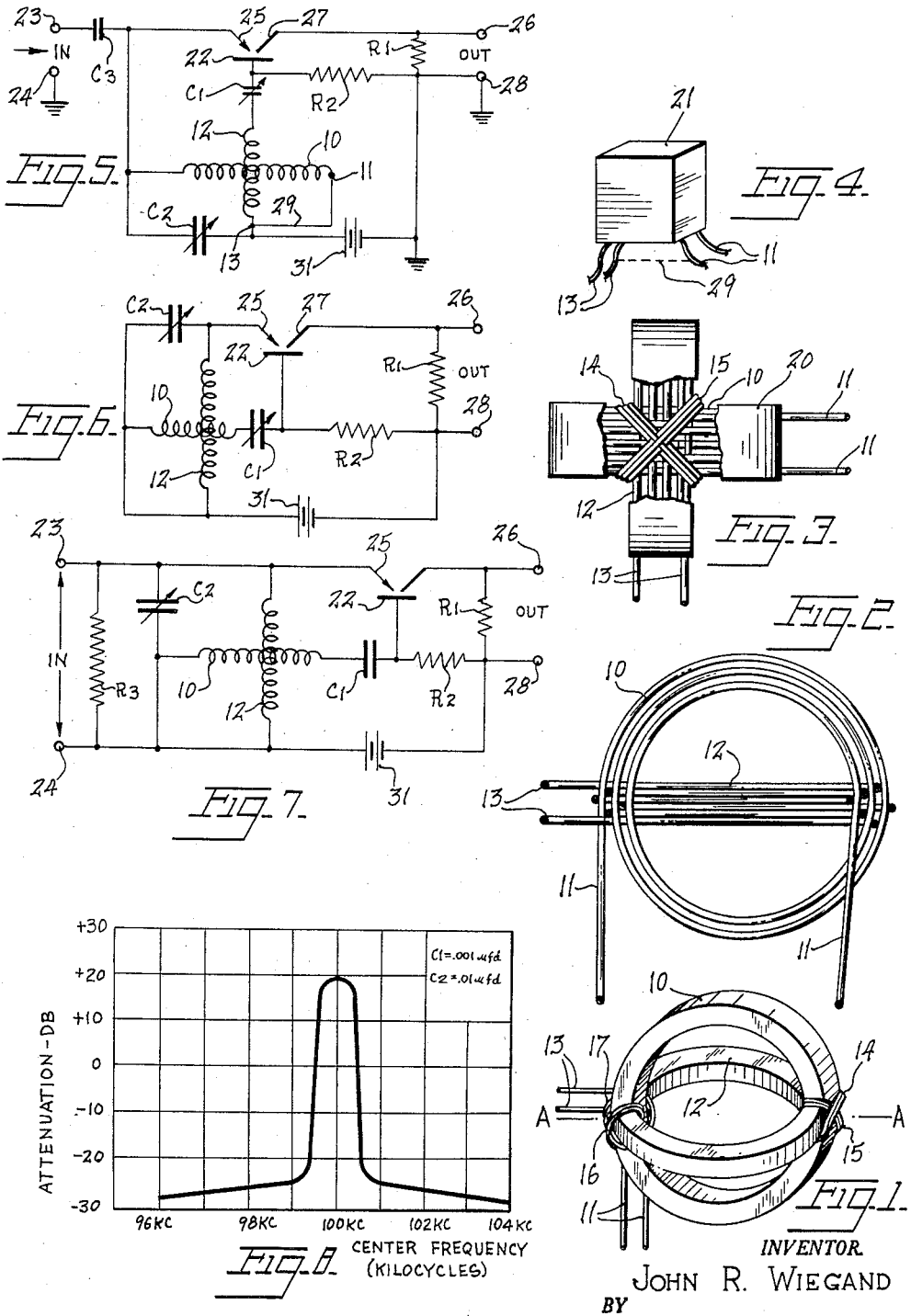

2,872,653

INTERCEPTOR TRANSFORMER

John R. Wiegand, North Valley Stream, N. Y.

Application March 7, 1956, Serial No. 570,160

4 Claims. (Cl. 336—221)

This invention relates to interceptor transformers useful as an electrical oscillation control device in a suitable electrical circuit.

It is a principal object of the present invention to provide an improved interceptor transformer which may be used in a high gain radio frequency or high frequency amplifier, particularly one employing a transistor as an active element.

Another object is to provide a miniature interceptor transformer which may be used as a component of an oscillator, interstage coupler, discriminator, amplifier or impedance matching device.

A further object is to provide an electrical oscillation control device useful in a low voltage transistor circuit including inductance and capacitance elements.

A further object is to provide a miniature interceptor transformer including primary and secondary coils in crossed positions and interwoven with each other, with magnetic cores or windings crossed and interwoven at the junctions of the crossed coils.

The general purpose and mode of operation of interceptor transformers is disclosed in my prior Patent 2,479,656, as well as in my co-pending applications 332,357 filed January 21, 1953, now Patent No. 2,740,096 and 449,838 filed August 16, 1954, now Patent No. 2,798,987. In the present device primary and secondary coils are crossed and interwoven so that their geometric and magnetic axes intersect at right angles to produce balanced magnetic fields. At the intersections of the coils which occur at opposite ends of a common diametral region are pairs of crossed, interwoven and magnetically balanced cores of magnetic wire. By crossing and interweaving the coils of the transformer the short time charge and discharge effects are improved without increase of reverse feedback effects to a source of oscillation. For best operation one coil should be connected in series with a capacitance while the interwoven crossed coil should have a capacitance connected across its terminals.

The two interwoven coils may be interconnected so that their inductance may be matched with suitable transistors to produce electrical oscillations ranging from one cycle to several megacycles per second. A direct current source such as a battery may be used as the source of electrical energy.

The present device may be more economically manufactured than previously known types of interceptor transformers, and requires a minimum of additional circuit components when used in a transistor circuit to produce self-excited oscillations.

An interceptor transformer according to the invention may have the overall dimensions of a quarter to a third of an inch, hardly larger than a sphere of one-third of an inch diameter. When used with a transistor of comparable dimensions, the invention makes possible the construction at reasonable cost of smaller miniature radio receivers and transmitters than have heretofore been manufactured.

For further comprehension of the invention, and of the objects and advantages thereof, reference will be had to the following description and accompanying drawings, and to the appended claims in which the various novel features of the invention are more particularly set forth.

In the accompanying drawings forming a materal part of this disclosure:

Fig. 1 is a perspective view of an interceptor transformer embodying the invention.

Fig. 2 is a plan view of crossed coils according to the invention.

Fig. 3 is a plan view of the interceptor transformer of Fig. 1 with portions of coil and core turns exposed.

Fig. 4 is a perspective view of a packaged interceptor transformer.

Fig. 5 is a schematic diagram of an amplifier circuit embodying the invention.

Fig. 6 is a schematic diagram of an oscillator circuit.

Fig. 7 is a schematic diagram of a discriminator circuit.

Fig. 8 shows a characteristic curve of the discriminator circuit.

The device shown in Fig. 1 includes a toroidal primary winding 10 which is a substantially flat circular coil of copper wire having terminals 11. A toroidal secondary winding 12 which is another substantially flat circular coil of copper wire is interwoven and linked with the primary winding at an angle of ninety degrees. Winding 12 has terminals 13. The wire in both coils is fine enameled or insulated wire.

Figs. 2 and 3 show the interwoven arrangement of the coils 10 and 12. The coils are interwoven turn by turn and the intersections at opposite sides of the coils occur at points in a common diametral region. The coils have substantially the same physical dimensions and are so arranged that their respective geometric and magnetic axes coincide and intersect at an angle of ninety degrees at a central point within the coils.

A pair of generally toroidal cores 14, 15 and another pair of generally toroidal cores 16, 17 are each interwoven and linked together and encircle the intersections of the coils. Each core is a small substantially flat circular winding of magnetic wire such as soft iron or the like. Core 14 is disposed at an angle of ninety degrees to core 15, and core 16 is disposed ninety degrees to core 17. Each core of an interwoven pair intersects the other at opposite ends of a common diametral region. All intersections or junctions of coils 10, 12 and cores 14, 15 and 16, 17 thus lie on points in the common diametral axis of region A—A. The cores are disposed at angles of forty-five degrees to the coils are shown in Fig. 3. Thus the magnetic and geometric axis of each core is disposed at an angle of forty-five degrees to the magnetic axis of each coil.

This crossing and interweaving of the coils with each other and the cores with each other, and the encircling of the coils by the cores insures magnetic balancing of the coils with each other, magnetic balancing of the cores with each other, and magnetic balancing of the cores and coils with each other.

The coils may be covered with an external protective wrapping 20 and the cores may have similar wrappings if desired.

Fig. 4 shows a miniature cubical structure 21 containing an interceptor transformer or interceptor oscillationformer as it is sometimes designated. This structure may be a plastic member in which the device is potted. One such structure which has been constructed has a maximum thickness of less than one-half inch and is usable in an oscillator circuit as shown in Fig. 6. The present device has a more compact structure than has heretofore been known in devices of this type. The coils 10 and 12 may have maximum diameters of the order of one-quarter inch or less and the cores 14—17 may be considerably smaller.

In the circuit of Fig. 5 is shown a high gain amplifier circuit employing a transistor 22. Input terminal 23 is connected to the input electrode 25 via capacitor $C_3$. Input terminal 24 is grounded. Output terminal 26 is connected to the collector electrode 27. Output terminal 28 is grounded. An output load resistor $R_1$ is connected across the output terminals. Resistor $R_2$ is connected between resistor $R_1$ and the junction of capacitor $C_1$ and the plate of the transistor. Capacitor $C_1$ is in series with secondary coil 12. One terminal of primary 10 is connected between capacitors $C_2$ and $C_3$. One of terminals 11 and one of terminals 13 are directly connected together or may be joined by jumper wire 29. Battery 31 provides energy to the circuit.

In operation a signal of one to ten microvolts at about 500 kilocycles may be applied to terminals 23, 24. The primary coil 10 induces an oscillating voltage in the secondary coil which is tuned by capacitor $C_1$ to the frequency of the input signal. A controlled self-excited amplified oscillation is obtained at terminals 26, 28. The output voltage represents a gain of as much as 200,000 to 300,000 or more. If the capacitance of capacitor $C_1$ were increased the self-excited oscillations would cease and no output would be obtained. The amplitude of the output can be varied by adjusting the capacitance of capacitor $C_2$. An input signal as small as one to ten microvolts at 500 kilocycles may result in an output of three to six volts at the same frequency. This circuit will readily operate in the range of 120 to 600 kilocycles per second.

Circuit values which may be employed in the circuit of Fig. 5 to obtain the results mentioned are:

| | |
|---|---|
| $C_1$ | mfd .0012 |
| $C_2$ | mfd .0047 |
| $C_3$ | mmfd 100 |
| $R_1$ | ohms 4,700 |
| $R_2$ | ohms 330,000 |

Battery 31 may be 22½ volts. Transistor 22 may be type SK722 or an equivalent.

The interceptor used is for D. C. and has a resistance of 36 ohms and inductance of 2.6 mh. in both coils (500 crossings with .001 copper wire crossed with .0008 nickel alloy #52 wire core).

In Fig. 6 is shown an oscillator circuit employing an interceptor oscillation-former according to the invention. Capacitor $C_2$ is connected across secondary coil 12 while capacitor $C_1$ is in series with coil 10. Capacitor $C_1$ should have a value about one-tenth of capacitor $C_2$. The circuit provides self-excited oscillations at terminals 26, 28 ranging from forty to 2 mc. depending on the values of $C_1$ and $C_2$ and the inductance of the interceptor coils. Capacitor $C_1$ tunes coil 10 and capacitor $C_2$ tunes coil 12. Energy feedback to sustain oscillations is applied to the primary coil from the output of the circuit via capacitor $C_1$. Resistors $R_1$ and $R_2$ may be 4,700 ohms and 330,000 ohms respectively, while battery 31 is 22½ volts.

In Fig. 7 is shown a discriminator circuit arranged like the circuit of Fig. 5, with the exception of an input resistor $R_3$ used in place of capacitor $C_3$. This resistor is connected across terminals 23, 24. A characteristic frequency response curve 33 for this circuit is shown in Fig. 8. The circuit is designed to have peak response at 100 kilocycles. The circuit has a very sharp signal pass band of plus and minus one percent of the center frequency. An input voltage of about one-half volt may produce an output of about three volts in this circuit.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An electrical oscillation control device comprising a substantially flat circular primary coil having a first pair of terminals, a substantially flat circular secondary coil having a second pair of terminals, said secondary coil being interwoven with and intersecting the primary coil at two diametrally opposed points each of the coils having coincident magnetic and geometric axes, the axes of the coils intersecting at a common central point within the coils, a first pair of magnetic cores encircling one intersection of said coils, and another pair of magnetic cores encircling the other intersection of said coils, whereby said coils are magnetically balanced about said common central point.

2. An electrical oscillation control device, comprising first and second substantially flat circular electrically conductive coils, said coils being interwoven and interlinked to cross each other at two diametrally spaced points thereof, a first pair of substantially circular magnetic cores interwoven and interlinked to cross each other at two diametrally spaced points thereof and encircling one intersection of said coils, and a second pair of substantially circular magnetic cores interwoven and interlinked to cross each other at two diametrally spaced points thereof and encircling the other intersection of said coils, all of said cores being so disposed on the coils that all of said diametrally spaced points occur on a substantially common diameter of said coils and said cores.

3. An electrical oscillation control device, comprising first and second substantially flat circular conductive coils, said coils being interwoven and interlinked to cross each other at two diametrally spaced points thereof, a first pair of substantially circular magnetic cores interwoven and encircling one intersection of said coils, and a second pair of substantially circular magnetic cores interwoven and encircling the other intersection of said coils, each of said cores being a generally toroidal winding of magnetic wire, each of said cores having its geometric and magnetic axis disposed at an angle of forty-five degrees to the geometric and magnetic axis of each of said coils, said coils having their geometric axes disposed at an angle of ninety degrees to each other.

4. An electric oscillation control device, comprising a pair of interwoven and intersecting substantially flat circular wire coils having their centers positioned at the same central point, magnetic and geometric axes of the coils being disposed at right angles and intersecting at said point, and means providing a balanced magnetic field for said coils, said means being disposed at opposite intersecting points of said coils, said means comprising two pairs of intersecting and interwoven magnetic wire cores respectively encircling said intersecting points.

References Cited in the file of this patent

UNITED STATES PATENTS

| | | |
|---|---|---|
| 1,667,705 | Von Wysiecki | Apr. 24, 1928 |
| 1,672,396 | Sieveking | June 5, 1928 |
| 2,058,037 | Rigandi | Oct. 20, 1936 |
| 2,750,452 | Goodrich | June 12, 1956 |